UNITED STATES PATENT OFFICE.

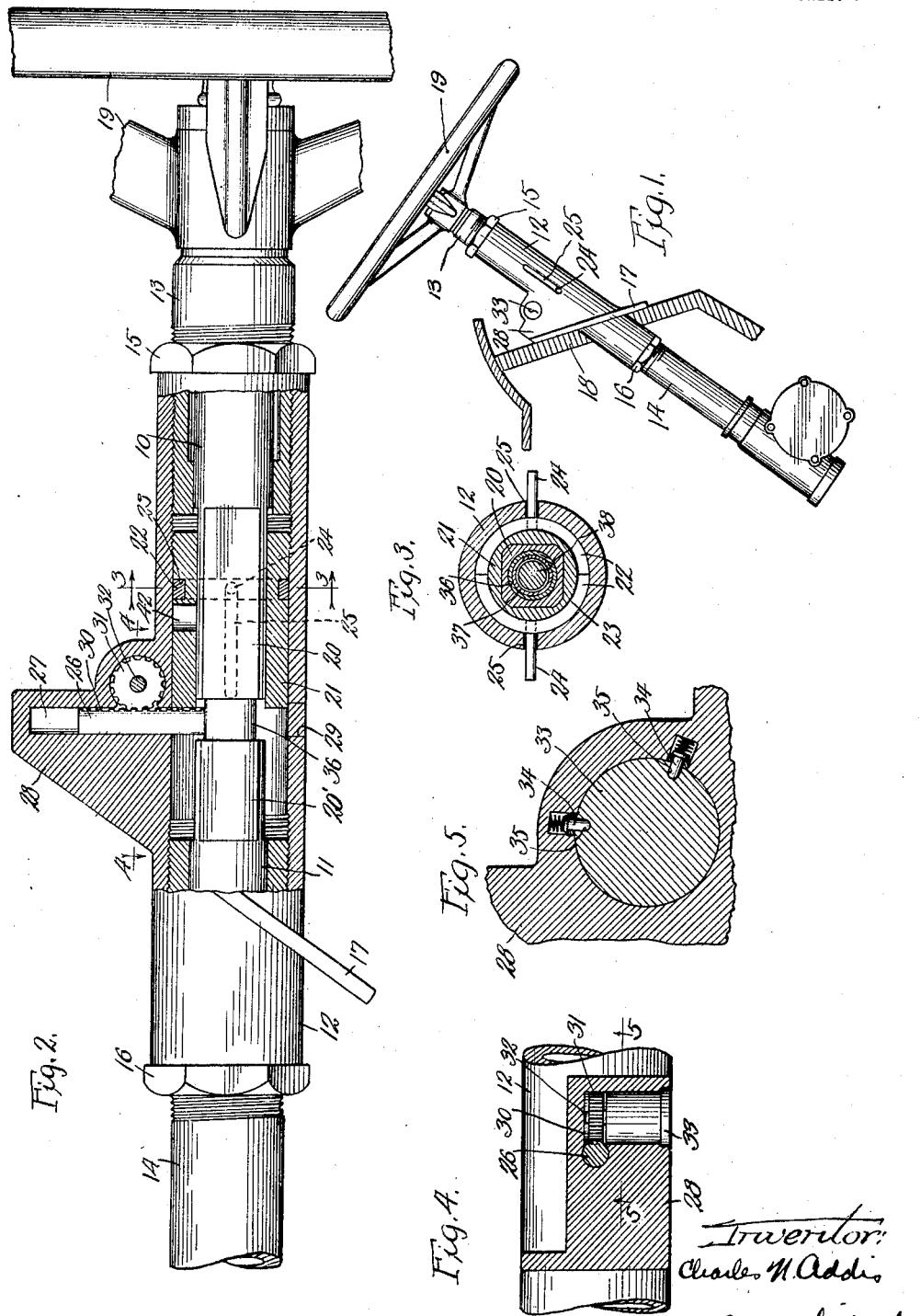

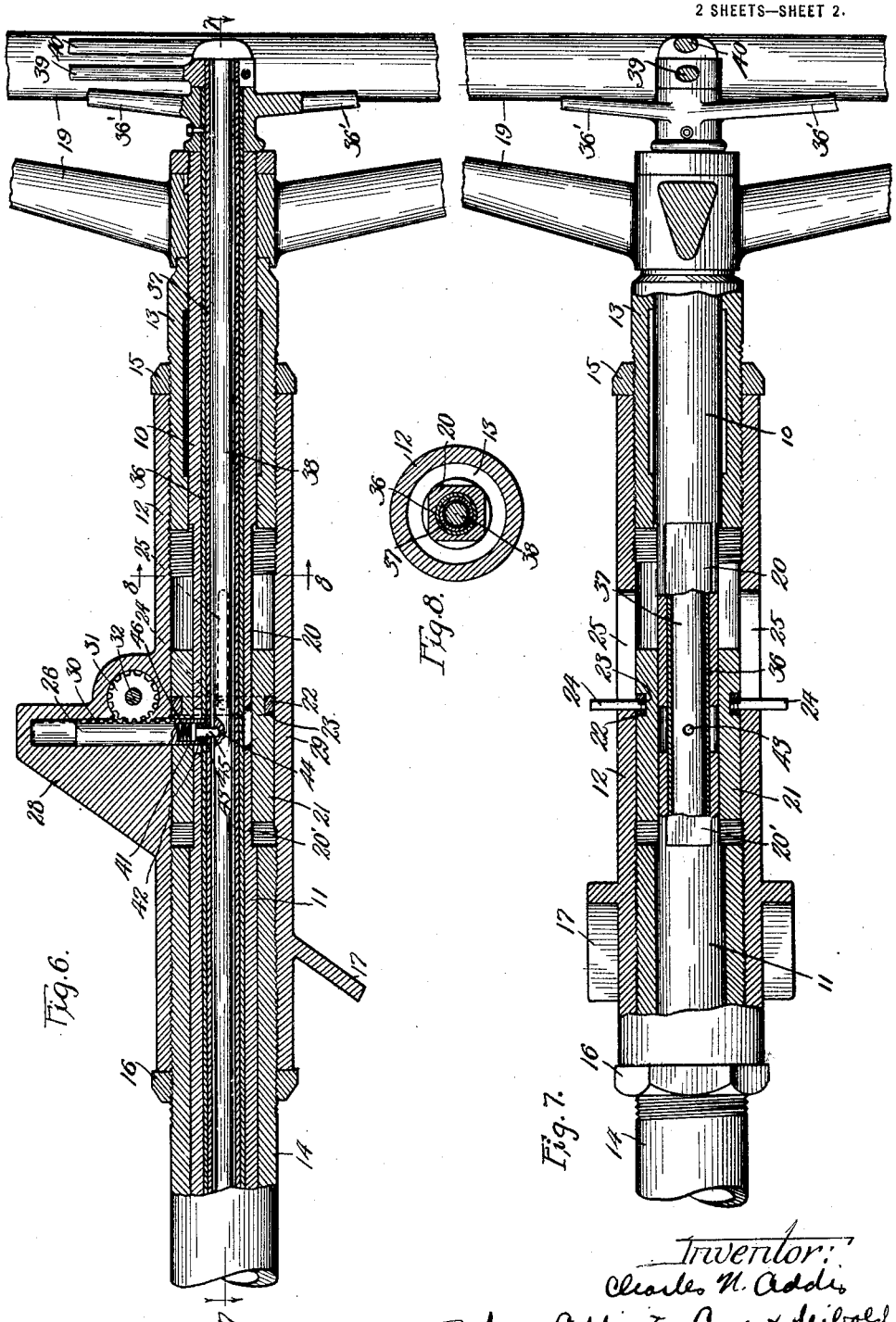

CHARLES N. ADDIS, OF DOWNERS GROVE, ILLINOIS, ASSIGNOR OF ONE-HALF TO JOHN SKWORCHINSKY, OF CHICAGO, ILLINOIS.

LOCK FOR MOTOR-DRIVEN VEHICLES.

1,400,507.    Specification of Letters Patent.    Patented Dec. 20, 1921.

Application filed November 26, 1919. Serial No. 340,783.

*To all whom it may concern:*

Be it known that I, CHARLES N. ADDIS, a citizen of the United States, residing at Downers Grove, in the county of Du Page and State of Illinois, have invented new and useful Improvements in Locks for Motor-Driven Vehicles, of which the following is a full, clear, concise, and exact description, reference being had to the accompanying drawing, forming a part of this specification.

My invention relates to improvements in locks for motor driven vehicles and has for its object the production of mechanism of this character which will be of economical construction and which will be adapted to effectually lock a vehicle against theft or unauthorized operation.

A further object is the production of locking mechanism of the character mentioned which may be readily and quickly operated by the owner or authorized driver of the vehicle to effect locking or unlocking of the vehicle.

Other objects will appear hereinafter.

With these objects in view, the invention consists in the combinations and arrangements of parts hereinafter described and claimed.

The invention will be best understood by reference to the accompanying drawings forming a part of this specification, and in which—

Figure 1 is a side elevation of the control mechanism of a motor driven vehicle embodying my invention, adjacent portions of the vehicle body being shown in section;

Fig. 2 is an enlarged sectional view of the vehicle control mechanism shown in Fig. 1, the locking mechanism thereof being shown adjusted to a position in which the steering wheel is free and inoperative;

Figs. 3 and 4 are sections taken on substantially lines 3—3 and 4—4 of Fig. 2;

Fig. 5 is an enlarged detail section taken on substantially line 5—5 of Fig. 4;

Fig. 6 is a view similar to Fig. 2 showing the locking mechanism arranged to effect locking of the steering wheel and the gas and spark control elements against rotary movement;

Fig. 7 is a section taken on substantially line 7—7 of Fig. 6; and

Fig. 8 is a detail section taken on line 8—8 of Fig. 6.

The preferred form of construction, as illustrated in the drawings, comprises a steering shaft consisting of two independent axial sections 10 and 11 which are rotatably mounted in a stationary housing or bearing formed of a central section 12 and end sections 13 and 14, said sections being threaded together and held in positions of rotary adjustment by locking nuts 15 and 16 respectively.

Upon the housing section 12 is provided an inclined flange 17 affording means for rigidly fastening the same to the dashboard or cowl 18 of the motor driven vehicle in connection with which the device is employed, as seen in Fig. 1.

To the upper end of the shaft section 20 is suitably secured the steering wheel 19. The adjacent end portions 20 and 20' of the shaft sections 10 and 11 are squared and loosely embracing said shaft sections is a slidably mounted sleeve 21, the interior of which is formed to conform with the squared formation of said shaft ends, as clearly seen in Fig. 3, so that when said sleeve is in engagement with both shaft ends 20 and 20', the shaft sections 10 and 11 will be operatively connected, as will be readily understood.

Embracing the sleeve 21 is a split ring 22 arranged in an annular groove 23 formed in the periphery of said sleeve. Projecting laterally from the two sections of ring 22 are handles 24 which pass exteriorly through elongated diametric slots 25 formed in the shaft housing 12, as clearly seen in Figs. 3 and 7.

The handles 24 afford means for manually shifting or lifting the sleeve 21 to inoperative position, that is, from engagement with the shaft section 11 in which position of said sleeve, the shaft section 10 will be disconnected from the shaft section 11 permitting of free rotation of the steering wheel which, in this case, will be disconnected from the front wheels of the vehicle. This disconnection of the steering wheel serves, of course, as a lock inasmuch as with the steering wheel thus disconnected, operation of the vehicle will be rendered impossible.

The sleeve 21 is locked in elevated or inoperative position by means of a bolt 26 which is shiftably mounted in a recess 27 formed for the reception thereof in an enlargement 28 on the housing section 12. In the assembling of the parts, the bolt 26 is inserted to position in recess 27 through an opening in the opposite side of housing member 12, which opening is subsequently closed by a plug 29. Said bolt is formed at one side with a rack 30 which meshes with a pinion 31 fixed to the rotary drum 32 of a conventional key controlled lock 33. Said lock 33 is suitably mounted in the enlargement 28, the same being locked in position therein by spring pressed pins 34 which are adapted to engage with recess 35 formed in the periphery of said lock, as clearly seen in Fig. 5.

The arrangement is such that the lock 33 may be actuated through the medium of the key thereof, in order to effect rotation of the pinion 31 and hence shifting of bolt 26. The bolt 26 is so arranged that when the same is at its inner terminal movement, it is adapted to engage with the lower edge of the sleeve 21 in order to lock said sleeve in inoperative position, as seen in Fig. 2. Rearward or downward shifting of said sleeve, when thus locked, may be effected only upon retraction of the bolt to its dotted line position, as seen in Fig. 6.

The shaft sections 10 and 11 are of tubular formation and fitted within the same is a tubular bearing member 36 which rotates with said shaft sections, the upper end of said member 36 being connected with the steering wheel 19 by arms 36'. Rotatably mounted within the tube 36 is the gas control tubular shaft 37 of the vehicle and rotatably mounted within the shaft 37 is the spark control shaft 38 of the vehicle. The upper ends of the shafts 37 and 38 project exteriorly and are provided with the usual control levers 39 and 40 respectively positioned at the steering wheel 19.

Formed in the sleeve 21, intermediate the ends thereof, is an opening 41 and formed in the parts 36, 37 and 38 are corresponding openings 42, 43 and 44 respectively, all of which openings are adapted to register with each other as clearly seen in Fig. 6. The openings 41 and 42 are of a size to permit of the passage of the end of the bolt proper 26, the openings 43 and 44, however, being of a size to permit of the passage of a terminal piece 45 of reduced diameter, which is mounted in the end of bolt 26. The terminal piece 45 is depressibly mounted, the same being yieldingly held in its forward or extended position by a helical compression spring 46, as clearly seen in Fig. 6.

The arrangement is such, as will be seen, that when the bolt 26 is at its inner terminal of movement, with the inner end thereof engaging with the openings 41, 42, 43 and 44, and sleeve 21 and hence the steering shaft will be locked against rotation, as will also the shafts 37 and 38 with the result that the steering mechanism and the gas and spark control elements will be positively locked against operation. Hence, with this position of the locking bolt, all of the control devices of the vehicle will be positively locked or rendered inoperative, serving to effectually lock the vehicle against unauthorized operation.

The locking bolt 26 is provided with a depressible or yieldable terminal, as described, so that in the locking of the vehicle, the bolt will first engage with the opening 41 in the sleeve 21 and the opening 42 in the bearing tube 36. Should the openings 43 and 44 not be in proper alinement, the terminal piece 45 will be simply depressed, but will automatically move into engagement with said openings 43 and 44 when the same are brought into proper position.

With a locking mechanism as described, then, it will be seen that an arrangement is provided whereby the steering wheel may be unlocked so as to rotate freely or in which said steering wheel and the spark and gas control elements may be positively locked against operation, in either event rendering operation of the vehicle impossible and therefore protected against theft.

While I have illustrated and described the preferred form of construction for carrying my invention into effect, this is capable of variation and modification without departing from the spirit of the invention. I therefore do not wish to be limited to the precise details of construction set forth but desire to avail myself of such variations and modifications as come within the scope of the appended claims.

Having thus described my invention, what I claim as new and desire to secure by Letters Patent is:

1. The combination with a plurality of concentric control elements of a vehicle having a stationary bearing, said elements having registrable openings, of a bolt shiftably mounted in said bearing, one end of said bolt being adapted to engage said openings for rendering said elements inoperative, the terminal portion of said bolt being depressible to permit of shifting of said bolt to operative position when some of said control elements are so positioned that the openings thereof are incapable of receiving said depressible terminal portion.

2. In combination, a vehicle steering shaft formed of two independent axial sections, a shiftable element operatively connecting said shaft sections, means for shifting said element to disconnect said shaft sections, and means for locking said element in inoperative position, said element having an opening adapted for engagement by said locking means when said element is in operative position for locking said shaft against rotation.

3. In combination, a vehicle steering shaft formed of two independent axial sections, rotary gas and spark control elements mounted in and concentric with said shaft, a shiftable sleeve loosely embracing the adjacent ends of said shaft and operatively connecting the same, means for shifting said sleeve to disconnect said shaft sections, means for locking said sleeve in inoperative position, said sleeve having an opening adapted, when said sleeve is in operative position to register with openings provided in said spark and gas control elements, said locking means, when said openings are in registration with each other being adapted to engage with said openings to lock said shaft and said control elements against rotation.

4. The combination with the steering shaft of a vehicle and associated spark and gas control elements, of locking means comprising a sleeve shiftable along said steering shaft having an opening therein, said gas and spark control elements also having openings therein, and means adapted to pass through said openings in said sleeve and said elements to lock the same.

5. In combination, a vehicle steering shaft formed of two independent axial sections, a shiftable sleeve loosely embracing the adjacent ends of said sections and operatively connecting the same, said sleeve having an opening therein, and means adapted either to lock said sleeve in such position that the operative connection of said sections is broken or to pass through said sleeve opening and thereby lock said shaft against rotation.

In witness whereof I have hereunto subscribed my name.

CHARLES N. ADDIS.

Witnesses:
 HERMAN MERTINOT,
 ALBERT T. SNOW.